Nov. 8, 1938.    F. L. ROOF    2,135,771
SNAP HOOK
Filed Feb. 3, 1938    2 Sheets-Sheet 1
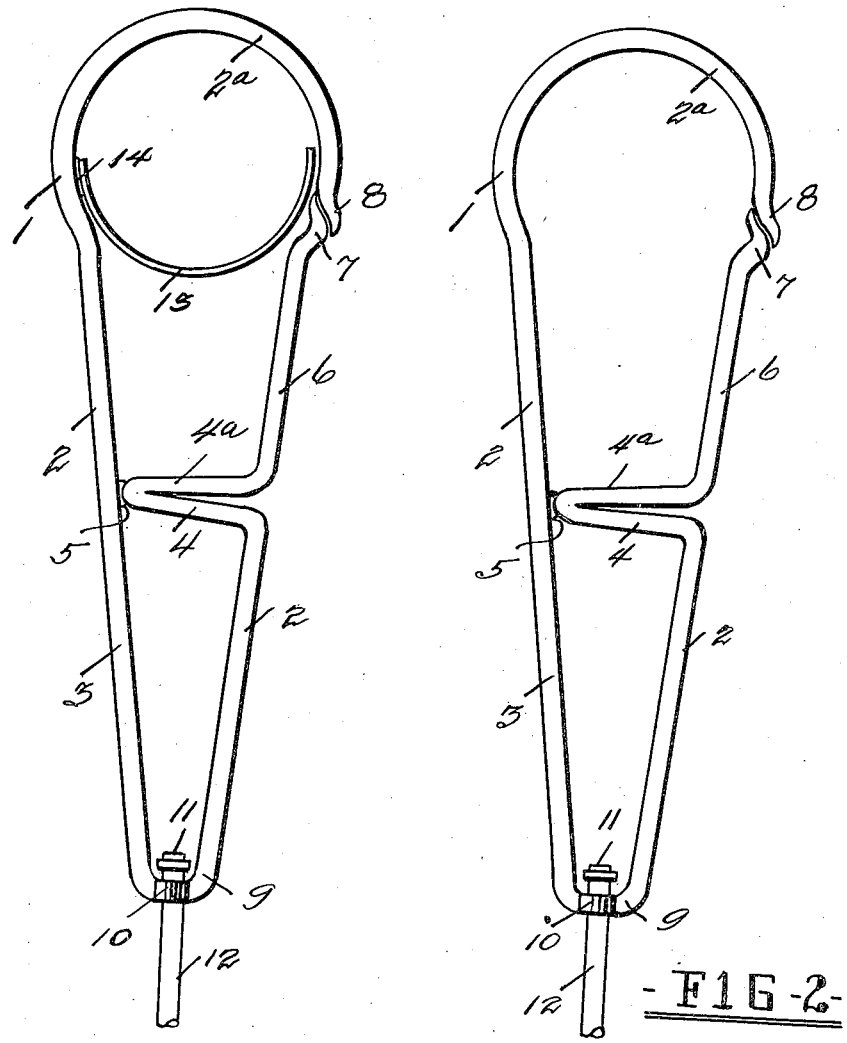
- FIG-1-    - FIG-2-
Inventor
FRANK L. ROOF,
By
Attorney

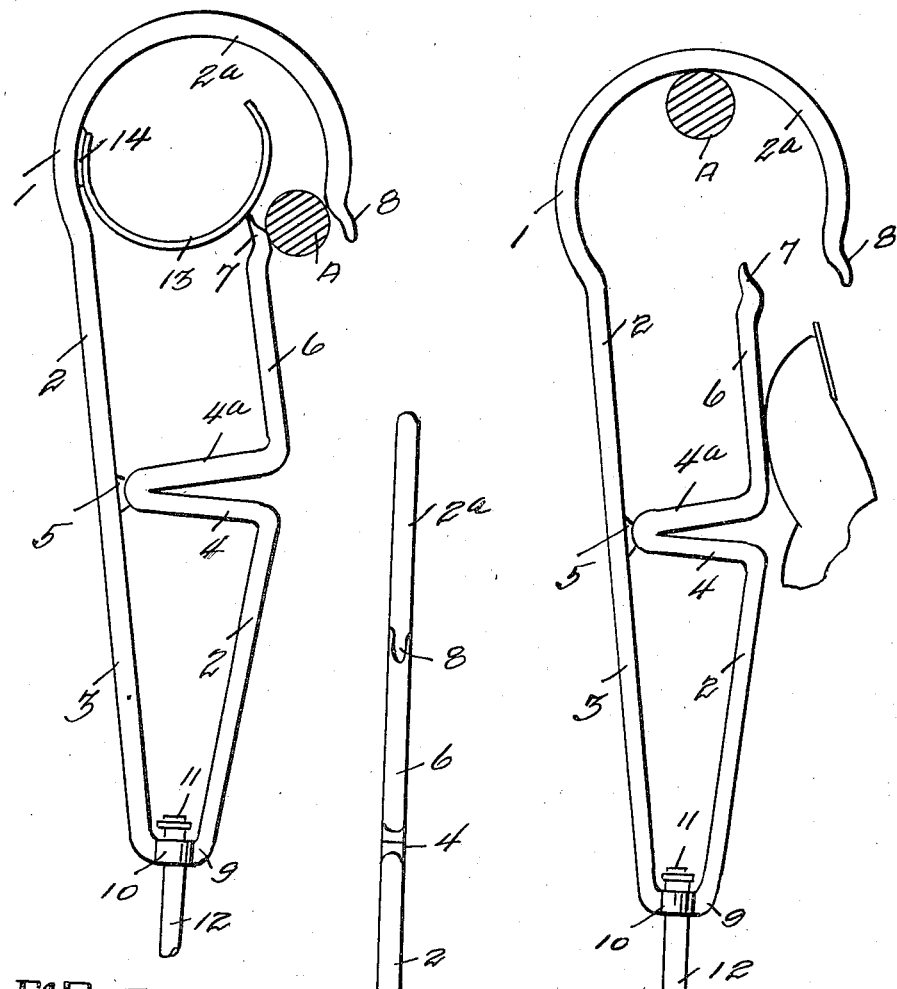

Patented Nov. 8, 1938

2,135,771

UNITED STATES PATENT OFFICE 2,135,771

SNAP HOOK

Frank L. Roof, Greensburg, Pa.

Application February 3, 1938, Serial No. 188,541

5 Claims. (Cl. 24—237)

My present invention, in its broad aspect, has reference to improvements in what are commonly known as snap hooks, and more particularly it is my purpose to provide a hook of this type which will more positively and securely retain an object hooked thereto against accidental disengagement. To this end the hook, shank, and spring keeper are all formed of one piece, and the portion of my hook serving as the keeper is formed with a leg which bridges the spaced portions of the shank and has its terminal end attached to the remote portion of the shank to give the keeper more support against dislodgment while retaining the desired resiliency or spring necessary to open the keeper to disengage an object from the hook.

Another important object of my invention is to provide means, in addition to the keeper, for locking an object engaged by the hook, and my hook and keeper are provided with improved contacting surfaces at the mouth of the hook to enable one to more readily engage and disengage an object from the hook.

Other and equally important objects of my invention are; first, to provide a snap hook which can be formed in one piece with relatively light material, and which will have retaining power and means preventing disengagement, much greater than is ordinarily capable of being imparted to a device of such simplicity and lightness; second, my snap hook is so formed that the pressure of the thumb or other part of the hand or the like against the keeper is facilitated and the opening of the keeper rendered more easy and at the same time, the keeper is so formed as to give added safety against disengagement or dislodgment and will not in time become inapt or ineffectual; third, my locking device is very simple in construction and since my hook, shank and keeper are all formed of one piece of material, in the modified form with the locking device only two pieces comprise the entire assembly; and fourth, the leg part of my keeper is a unique and effective improvement over devices heretofore adapted for this purpose.

Other objects and advantages will be apparent as the detailed description of my invention proceeds, but interpretation of my invention should only be conclusive when made in the light of the subjoined claims, and changes in form, shape, size and arrangement of parts are permitted provided same fall within the purview of the claims.

Two forms of my invention are illustrated in the drawings, but basically the construction and shape of my hook and its parts are the same in both forms, one form is to be distinguished from the other merely by the inclusion of a spring lock in the hook portion.

Figure 1 is a view of my snap hook with the spring lock applied to the hook part to cooperate with the keeper in keeping an object within the hook;

Figure 2 is a view of my snap hook without a spring locking part carried by the hook;

Figure 3 is a view of the form of my invention shown in Figure 1, namely with the spring lock, with the parts thereof in position to receive an object within the hook, as for instance a link, and the object is shown as being between the points of the hook and keeper (the mouth) and about to enter the hook, with both the keeper and the spring lock flexed inwardly;

Figure 4 is a view of the form of my invention shown in Figure 2 with the thumb of an operator in the position taken to flex inwardly the keeper so that an object may be disengaged from the hook; and Figure 5 is an edge view, taken from the front, of my hook, and shows the very slightly normal spaced position of the parts of the transverse portion when the keeper is closed, and the slightly tapered formation of the end of the hook part.

In the drawings wherein like characters of reference are used to designate like or similar parts throughout the several views;—

The numeral 1 designates a piece of wire-like material bent intermediate its length to form the diverging portions or legs 2 of the shank 3 of my hook; one leg being extended and bent circularly (or otherwise) to form the hook portion of my device 2a and the other leg being formed with a bent portion 4 extending transversely of the shank and having its terminal end spot welded or braised as at 5 to the other leg to form a support for the remaining part of the leg 6 which constitutes the keeper of the hook and whose terminal end 7 engages the terminal end 8 of the hook part 2a. Where the piece of material is originally bent constitutes the butt 9 of the snap hook and this is slightly flattened and enlarged as at 10 and formed with an opening to receive the swivel connection 11 of a line or cable 12 to which the hook is attached. The meeting ends 7 and 8 are slightly tapered, and the end 7 is turned out and then in at an angle, and at the end 8 turned out and then slightly down so that the ends fit against each other to form a slanting mouth of a form and arrangement which makes it easy to attach the hook to an object, but difficult or substantially impossible to accidently disengage an object from the hook. My keeper as will be seen is formed by a part of the transverse member 4, and for clarity this will be designated the transversely part 4a of the keeper, which extends substantially at right angles to the body part of the keeper, as a result additional assurance is given that the keeper will not become ineffective and furthermore dislodgment of an object from the hook is prevented by the shape of the keeper which renders it unlikely that the keeper will spring outwardly or become otherwise out of shape so that its effectiveness will be impaired or lost. Furthermore the part 4 being spotwelded or braised to the other leg 2 of the shank, the lower portion of the shank is rigid, while the keeper has the desired spring or resiliency to permit inserting an object in the hook, and at the same time the entire device is formed of one piece of material, also the angular shape of the keeper locates a part of its length within the shank of the hook itself so that to open the keeper the finger presses only the body portion thereof, and if the object engaged by the hook slips down against the part 4a of the keeper it serves to more effectually force the end 7 of the keeper against the end 8 of the hook. The angular formation of the keeper also serves to resist flexing out of the keeper which would render it ineffectual.

The form of my invention shown in Figure 1 is provided also with a semi-circular spring locking device which cooperates with the keeper and hook and is designated 13 one end of which is spot welded or braised as at 14 to the back of the hook and the other end of which bears against or is closely adjacent to the end of the keeper and the front of the hook to close the mouth. It will be noted that flexing of the keeper inwardly causes its end 7 to engage and flex inwardly the spring lock 13 as shown in Figure 3 so that an object can be readily disengaged from the hook with one motion or operation—simply by pressing on the keeper. In Figure 4 is shown the thumb of an operator pressing on the keeper at the start of the process of disengaging an object (such as a link A) from the hook. In Figure 3 the pressure of the link A or other object is shown as actuating the keeper and spring to engage it in the hook.

From the foregoing it is believed that the operation and advantages of my invention will be apparent, but stress is laid on the peculiar formation of the keeper, and the manner in which the efficiency of this element of my invention is increased while at the same time the general structure of my snap hook is simplified. The broad basis of my inventive concept is defined in the appended claims from which interpretation of the scope of my invention is to be taken.

I claim:—

1. A snap hook comprising a hook portion, a shank and a keeper all formed of a single piece of material having a butt and spaced members forming the shank and extended on one side to form the hook, the other side of the shank having a laterally extending substantially V-shaped projecting part intermediate its ends to form a transverse support the end of which engages the first side of the shank, and the remaining part of said side forming the keeper which extends substantially at right angles to the bent portion and in alignment with the side, and the transverse part attached to the remaining side of the shank.

2. A snap hook comprising a hook portion, a shank, and a keeper all formed of a single piece of material, said shank being formed with spaced side portions, one side portion being longer than the other and extended to provide the hook, and the other side portion forming the keeper and having a laterally extending substantially V-shaped projecting part intermediate its ends forming a transverse support touching and attached to the remaining side of the shank.

3. A snap hook comprising a hook portion, a shank and a keeper all formed of a single piece of material providing a shank having a butt and two diverging spaced sides, one side being longer than the other and formed to provide a hook, and the other and shorter side forming the keeper, and said shorter side having a substantially V-shaped portion between its ends positioned to form a transverse reinforcing and supporting member having its end attached to the longer side, the ends of the piece of material being respectively the end of the hook and the end of the keeper being shaped to form a slanting entering opening to the hook and interfitting to make a tight contact when the keeper is in closing position with respect to the hook.

4. A snap hook comprising a hook, a shank and a keeper, the keeper being formed with a body portion in longitudinal alignment with a side of the shank and a transversely extending portion formed in the shank and having a substantially V-shaped projection abutting and attached at its end to the remaining side of the shank, a spring locking member carried by the hook member and extending about the base of the hook member and across the point where the shank joins the hook member and across the point of contact between the end of the hook and the end of the keeper cooperating therewith.

5. A one-piece snap hook construction formed of a length of material having a curved portion at one end forming a hook, two spaced side parts forming the shank, a butt portion between the ends of the side parts, and the terminal end of one part side engaging the end of the curved portion forming the hook to provide a keeper, said latter side having a transversely extending part between its ends and extending across the space between the two sides to a point of engagement with the other side, said transverse part having substantially a narrow V-shaped formation with the legs thereof connected at the end of the part and adapted to resist separation from each other thereby to normally hold the keeper in closed position.

FRANK L. ROOF.